US011766825B2

(12) United States Patent
Borgstrom et al.

(10) Patent No.: US 11,766,825 B2
(45) Date of Patent: Sep. 26, 2023

(54) THREE-DIMENSIONAL PRINTING SYSTEM WITH IMPROVED POWDER COATING UNIFORMITY

(71) Applicant: LAYERWISE NV, Leuven (BE)

(72) Inventors: Carl Borgstrom, Lakewood, CO (US); Dustin Crouse, Lakewood, CO (US); Nachiketa Ray, Leuven (BE); James Vander Linden, Green Bay, WI (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/965,002

(22) Filed: Oct. 13, 2022

(65) Prior Publication Data

US 2023/0124531 A1     Apr. 20, 2023

Related U.S. Application Data

(60) Provisional application No. 63/255,636, filed on Oct. 14, 2021.

(51) Int. Cl.
*B29C 64/153* (2017.01)
*B29C 64/245* (2017.01)
(Continued)

(52) U.S. Cl.
CPC .......... *B29C 64/153* (2017.08); *B29C 64/205* (2017.08); *B29C 64/214* (2017.08);
(Continued)

(58) Field of Classification Search
CPC ............................. B29C 64/153; B29C 64/165
See application file for complete search history.

(56) References Cited

U.S. PATENT DOCUMENTS 9,713,856 B2     7/2017 Fockele
9,919,476 B2 *   3/2018 Paternoster ........... B29C 64/153
(Continued)

FOREIGN PATENT DOCUMENTS

EP     2052845 B1     6/2011
EP     2983895 B1     4/2014
(Continued)

OTHER PUBLICATIONS

PCT International Search Report for International Search Authority for PCT/IB2022/000605 dated Mar. 16, 2023 (6 pages).
(Continued)

*Primary Examiner* — Atul P. Khare (57) ABSTRACT

A three-dimensional printing system includes a build platform, a movement mechanism, a coating module, a consolidation module, and a controller. The controller is configured to (1) operate the movement mechanism and the coating module to deposit a new powder layer over an upper surface of the build platform or powder, (2) operate the consolidation module to selectively consolidate the new powder layer, and (3) repeat (1) and (2) until a three-dimensional article is fabricated from a plurality of layers. Step (1) includes, at least one of the plurality of layers (a) operate the movement mechanism and the coating module to deposit a first sublayer of powder having a thickness T1 over the upper surface, and (b) operate the movement mechanism and the coating module to deposit a second sublayer of powder having at thickness T2 over the first sublayer of powder. T2 is less than 20% of T1.

20 Claims, 7 Drawing Sheets

(51) Int. Cl.
  *B29C 64/232* (2017.01)
  *B29C 64/205* (2017.01)
  *B29C 64/268* (2017.01)
  *B33Y 50/02* (2015.01)
  *B29C 64/218* (2017.01)
  *B29C 64/393* (2017.01)
  *B33Y 10/00* (2015.01)
  *B33Y 30/00* (2015.01)
  *B29C 64/214* (2017.01)
  *B33Y 80/00* (2015.01)

(52) U.S. Cl.
  CPC .......... *B29C 64/218* (2017.08); *B29C 64/232* (2017.08); *B29C 64/245* (2017.08); *B29C 64/268* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 10,195,693 B2 | 2/2019 | Buller et al. | |
| 10,328,526 B2 | 6/2019 | Ols et al. | |
| 10,406,599 B2 * | 9/2019 | Ljungblad | B22F 7/02 |
| 10,702,921 B2 * | 7/2020 | Volk | B29C 64/153 |
| 10,780,636 B2 * | 9/2020 | Paternoster | B22F 12/67 |
| 10,792,861 B2 * | 10/2020 | Philippi | B33Y 10/00 |
| 10,960,467 B2 | 3/2021 | Golz et al. | |
| 11,077,611 B2 * | 8/2021 | Ederer | B29C 64/214 |
| 11,192,295 B2 * | 12/2021 | Paternoster | B29C 64/165 |
| 11,396,175 B2 * | 7/2022 | Paternoster | B29C 64/153 |
| 2015/0202826 A1 | 7/2015 | Paternoster | |
| 2019/0375157 A1 | 12/2019 | Fokele et al. | |
| 2020/0079009 A1 | 3/2020 | Paternoster | |
| 2020/0147689 A1 | 5/2020 | Neirinck et al. | |
| 2020/0147870 A1 | 5/2020 | Neirinck et al. | |
| 2020/0206817 A1 | 7/2020 | Ray et al. | |
| 2020/0238608 A1 | 7/2020 | Barnes | |
| 2020/0316717 A1 | 10/2020 | Plas et al. | |
| 2020/0384693 A1 | 12/2020 | Bennett et al. | |

FOREIGN PATENT DOCUMENTS

| | | |
|---|---|---|
| JP | 2020082486 A | 6/2020 |
| WO | 2014095200 A1 | 6/2014 |
| WO | 2017143145 A1 | 8/2017 |

OTHER PUBLICATIONS

PCT International Written Opinion for International Search Authority for PCT/IB2022/000605 dated Mar. 16, 2023 (7 pages).

* cited by examiner

THREE-DIMENSIONAL PRINTING SYSTEM WITH IMPROVED POWDER COATING UNIFORMITY

CROSS-REFERENCE TO RELATED APPLICATIONS

This non-provisional patent application claims priority to U.S. Provisional Application Ser. No. 63/255,636, Entitled "Three-Dimensional Printing System with Improved Powder Coating Uniformity" by Rocky Borgstrom et al., filed on Oct. 14, 2021, incorporated herein by reference under the benefit of U.S.C. 119(e).

FIELD OF THE INVENTION

The present disclosure concerns an apparatus and method for fabrication of three-dimensional (3D) articles through a layer-by-layer selective consolidation of powder materials. More particularly, the present disclosure concerns an improvement in process uniformity.

BACKGROUND

Three dimensional (3D) printing systems are in rapidly increasing use for purposes such as prototyping and manufacturing. One type of three dimensional printer utilizes a layer-by-layer process to form a three dimensional article of manufacture from powdered materials. Each layer of powdered material is selectively fused using an energy beam such as a laser, electron, or particle beam. One challenge in operating a system is maintaining uniformity and quality of the dispensed layers of powder.

SUMMARY

In an aspect of the disclosure, a three-dimensional (3D) printing system includes a build platform, a movement mechanism configured to vertically position the build platform, a coating module, a consolidation module, and a controller. The controller is configured to (1) operate the movement mechanism and the coating module to deposit a new layer of powder over an upper surface of the build platform or a previously deposited layer of powder, (2) operate the consolidation module to selectively consolidate the new layer of powder, and (3) repeat (1) and (2) until a three-dimensional (3D) article is fabricated from a plurality of consolidated layers. Step (1) includes, for one or more of the plurality of layers (a) operate the movement mechanism and the coating module to deposit a first sublayer of powder having a thickness T1 over the upper surface, and (b) operate the movement mechanism and the coating module to deposit a second sublayer of powder having at thickness T2 over the first sublayer of powder, T2 is less than 20% of T1.

By forming a new layer of powder from sublayers of varying thickness, the uniformity of the new layer of powder is improved. This is true even a topography of consolidated layers under the new layer of powder varies.

In particular, the disclosed system and method solves a problem with formation of three-dimensional (3D) articles having vertically protruding structures. As a layer of powder is spread over a protruding structure, fluidic effects of spreading the powder can form either peaks and/or depressions in the powder that will result in dimensional or material defects. The second sublayer of material corrects such a defect.

In one implementation, the coating module includes a smoothing member with a controlled spacing over the upper surface. The controlled spacing determines a thickness of a sublayer of powder that is deposited during step (a) and (b). The blade can have a fixed vertical position and the controlled spacing controlled or determined by a movement mechanism vertical positioning of the build platform. The smoothing member includes one or more of a blade, a tube, and a roller. During step (a) the smoothing member is translated along first direction (+X). During step (b) the smoothing member is translated along a second direction (−X) that is opposite to the first direction.

In other implementations the consolidation module is one of an energy beam module and a binder dispensing module. When the consolidation module is an energy beam module, it can include one or more of a laser beam module and an electron beam module. When the consolidation module includes a laser beam module, it also includes a scanning system that can include a pair of galvanometer mirrors including an X-mirror and a Y-mirror. Controlled motion of the mirrors scans the laser beam over a build plane.

In yet another implementation, (1) can include operate the movement mechanism to lower the build platform by a distance generally equal to a sublayer thickness, and operate the coating module to pass over the build platform to deposit a sublayer of powder.

In a further implementation, (1) can include operating the movement mechanism and the coating module to deposit a third sublayer of powder having at thickness T3 over the second sublayer of powder, T3 is less than 20% of T1.

In a yet further implementation, T2 is less than 10% of T1. T1 can be less than 50 microns. T2 can be less than 5 microns. T2 can be in a range of 1-4 microns, 1-3 microns, 1-2 microns, or about 1 micron.

DETAILED DESCRIPTION OF THE PREFERRED EMBODIMENTS

Figure 1:
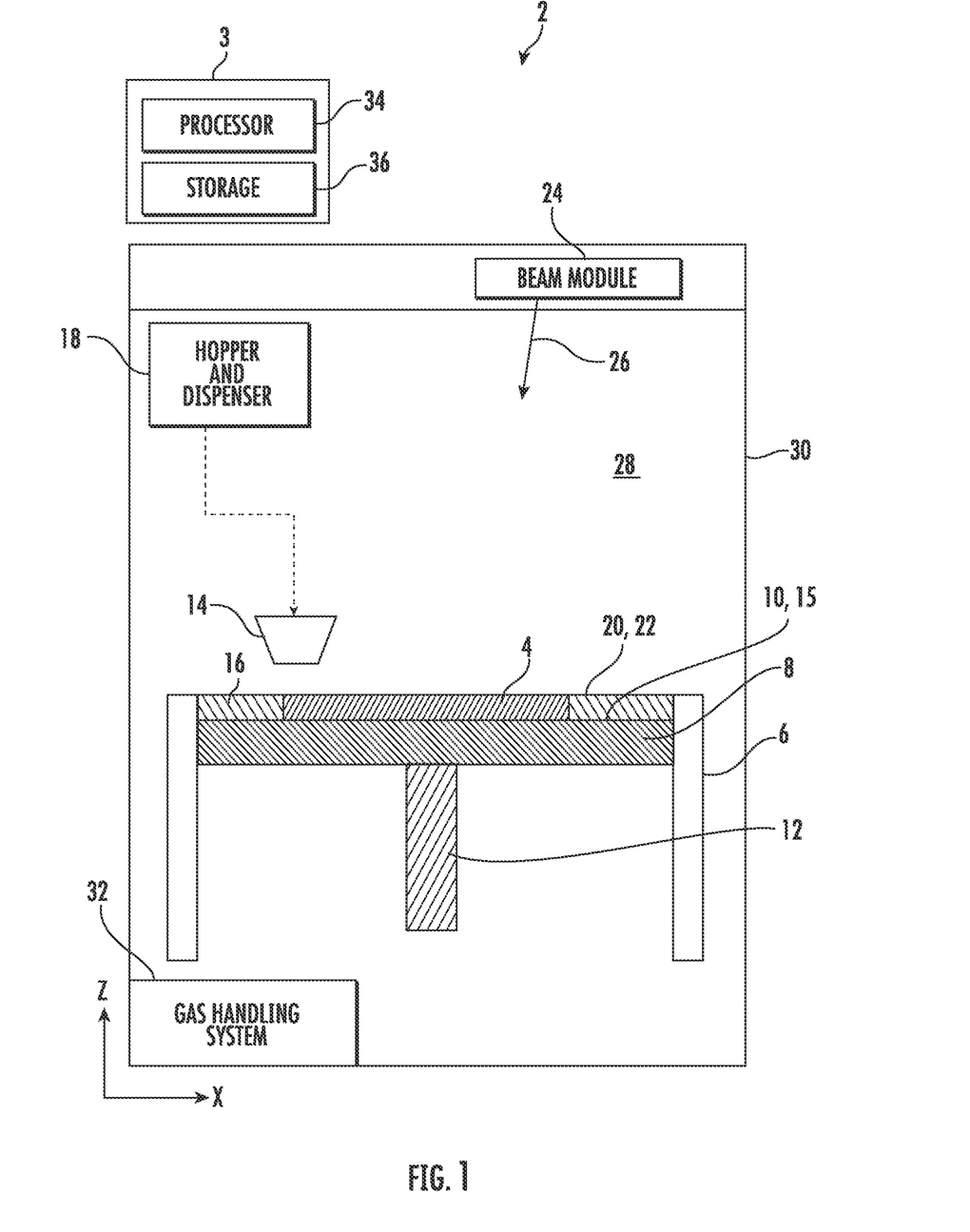
FIG. 1 is a schematic drawing of a three-dimensional (3D) printing system for fabricating a 3D article in a layer-by layer manner.

FIG. 1 is a schematic drawing of a three-dimensional (3D) printing system 2 for fabricating a 3D article 4 in a layer-by-layer manner. In describing three-dimensional (3D) printing system 2, mutually orthogonal axes X, Y, and Z can be used. The X and Y axes are generally horizontal or lateral and the Z axis is generally vertical and generally aligned with a gravitational reference. By "generally" it is implied that a factor is by design to within manufacturing tolerances. System 2 includes a controller 3 for controlling various portions and components of the system 2 and to receive information from sensors embedded within system 2.

System 2 includes a build container 6 containing a build platform 8. Build platform 8 has an upper surface 10 above which the 3D article 4 is fabricated. A movement mechanism 12 is coupled to the build platform 8. The movement mechanism 12 is configured to controllably and vertically position the build platform 8 along the vertical Z-axis. The movement mechanism 12 can include a mechanical drive such as a rack and pinion, lead screw, or other drive system. A lead screw drive system can include a lead screw coupled to a fixed motor. The lead screw can be received into a threaded nut that is coupled to the build platform 8. Under command of the controller 3, the motor can turn the lead screw to vertically position the build platform 8.

System 2 includes a coating module 14 that is configured to receive a powder material 16 from a hopper and dispenser system 18 and to form new layers of the coating material 16 above the build platform 8. A particular embodiment of a coating module will be further described infra. The coating module 14 forms a new layer of powder 16 as it traverses above the build platform 8. When a new layer of powder 16 is formed, it has an upper surface 20. The upper surface 20 is generally coplanar with a "build plane" 22 before a selective consolidation of the new powder 16 layer takes place.

System 2 includes a consolidation module 24. Consolidation module 24 is configured to selectively consolidate the new layer of powder 16 through use of an energy beam or binder. In the illustrated embodiment, the consolidation module 24 is a beam module 24 that generates one or more energy beams 26 and scans the energy beams 26 over the build plane 22 to selectively fuse (melt or sinter) the new layer of powder 16. In one particular embodiment, the beam module 24 can include a laser for generating a radiation beam 26 and a scanner for scanning the radiation beam 26 across the build plane 22. The scanner can include two motorized mirrors in series including an X-mirror and a Y-mirror which steer the radiation beam along the X-axis and the Y-axis respectively. In another particular embodiment, the beam module 24 can generate an electron beam.

In an alternative embodiment, the consolidation module 24 can include a jetting device for selectively dispensing a binder onto the new layer of powder 16. The binder can be an adhesive or reactive fluid that is dispensed to selectively bind powder particles that form the new layer of powder 16.

In the illustrated embodiment, portions of the system 2 can be contained within a chamber 28 defined by a housing 30. A gas handling system 32 is coupled to the chamber 28. The gas handling system 32 can include a vacuum pump and a source of gas to backfill chamber 28 after it is evacuated. The source of gas can include non-oxidizing gases such as argon or nitrogen.

The controller 3 includes a processor 34 coupled to a non-transient information storage module 36. The non-transient information storage module 36 stores software instructions. When executed by the processor 34, the software instructions control portions of system 2 including the movement mechanism 12, the coating module 14, the hopper and dispenser system 18, the consolidation module 24, and the gas handling system 32. Through the execution of the software instructions, the controller 3 is configured to: Step (1) operate the movement mechanism 12 and the coating module 14 to deposit a new layer of powder over an upper surface (10 or 20) of the build platform (upper surface 10) or a previously deposited layer of powder 16 (upper surface 20). Step (2) operate the consolidation module 24 to selectively consolidate the new layer of powder 16, and repeat (Step 1) and (Step 2) until a three-dimensional article is fabricated from a plurality of layers.

Step (2) can include the following steps (sub-steps) for one or more of the plurality of layers: Sub-step (a) operate the movement mechanism 12 and the coating module 14 to deposit a first sublayer of powder 16 having a thickness T1 over the upper surface 20. Sub-step (b) operate the movement mechanism and the coating module to deposit a second sublayer of powder 16 having at thickness T2 over the first sublayer of powder, T2 is less than 20% of T1. In the foregoing, element 15 will be referred to as an "upper surface" that can be surface 10 or 20 upon which a new layer of powder 16 is to be deposited.

Figure 2A:
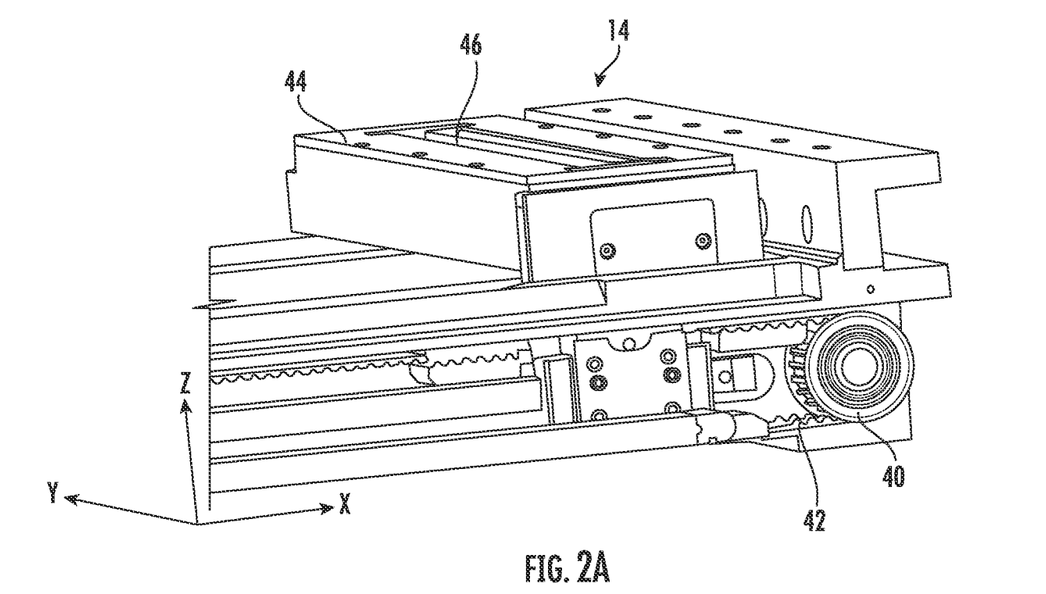
FIG. 2A is an isometric side view of an embodiment of a first embodiment of a coating module.
Figure 2B:
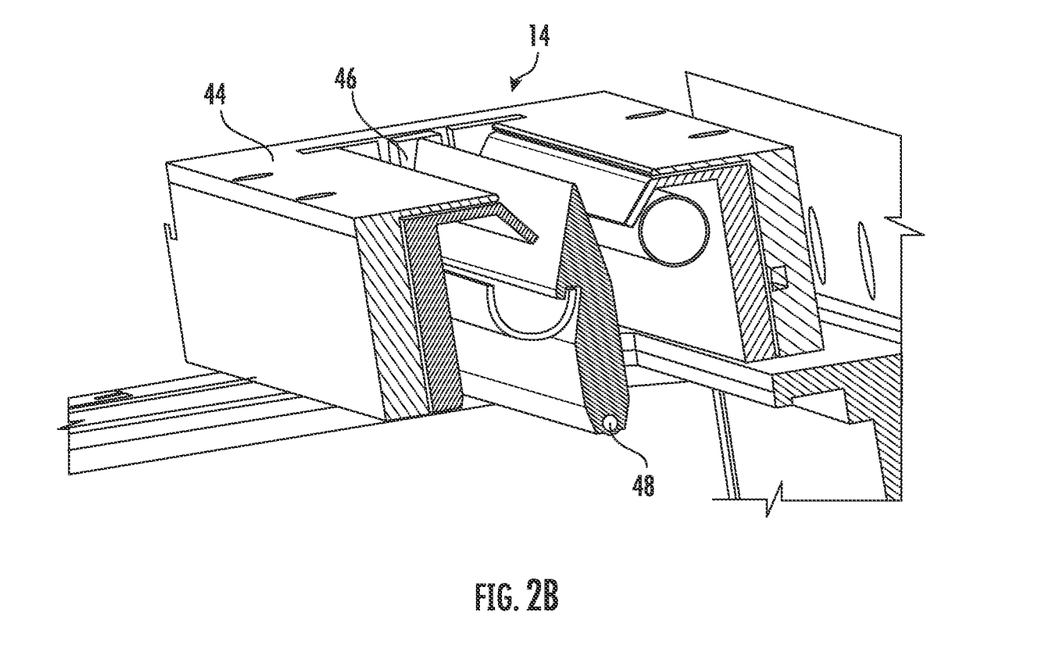
FIG. 2B is an isometric cutaway view of a first embodiment of a coating module.

FIGS. 2A and 2B illustrate a first embodiment of a coating module 14 for depositing a new layer of powder 16 onto an upper surface 15. FIG. 2 is an isometric side view of the coating module 14 and associated mechanism and FIG. 2B is an isometric cutaway view of the coating module 14.

In the illustrated embodiment a gear 40 coupled to a motor (not shown) engages a toothed belt 42. An upper side of the toothed belt 42 is attached to a coater 44. When the motor rotates the gear 40 the coater 44 is thereby translated along the X-axis. The coater 44 includes an inlet slot 46 and a smoothing member 48. In the illustrated embodiment, the smoothing member 48 is a tube. In various embodiments, the smoothing member can include one or more of a rotating roller, a non-rotating blade, and a non-rotating tube to name a few examples.

Under control of controller 3, the motor translates the coater 44 to a position at which the hopper and dispenser 18 can load powder 16 into the coater 44 via the inlet slot 46. Then as the coater 44 is translated along the X-axis, it deposits a new layer of powder 16 over the upper surface 15. A resultant thickness T of the new layer of powder 16 is determined by a vertical position of the upper surface 15 along the Z-axis relative to the vertical position of the smoothing member 48. This is because a vertical position of the smoothing member 48 is fixed in the illustrated embodiment.

Variations of the coating module 14 are possible. For example, the coating module 14 can receive powder from a chamber that is below the coating module. The coating module 14 can have more than one smoothing member 48. The thickness T can be determined in part by smoothing member 48 having a variable and controllable vertical position. The coating module 14 can have another type of mechanism for translating the coater 44 such as a rack and pinion system or a lead screw that engages a threaded bearing passing through the coater 44. Any of these variations can be envisioned and used to practice some or all of the claimed aspects of the present disclosure.

In an illustrative embodiment, the coating module 14 is configured for bidirectional translation motion during powder deposition under control of controller 3. While depositing and smoothing a sublayer of powder, the coater 44 can translate in either a first direction (+X) or a second direction (−X). The second direction is opposite to the first direction. The change in direction changes from one sublayer to the next in order to eliminate artifacts created by "powder fluidics" induced by underlying features of the 3D article 4 being formed.

Figure 3:
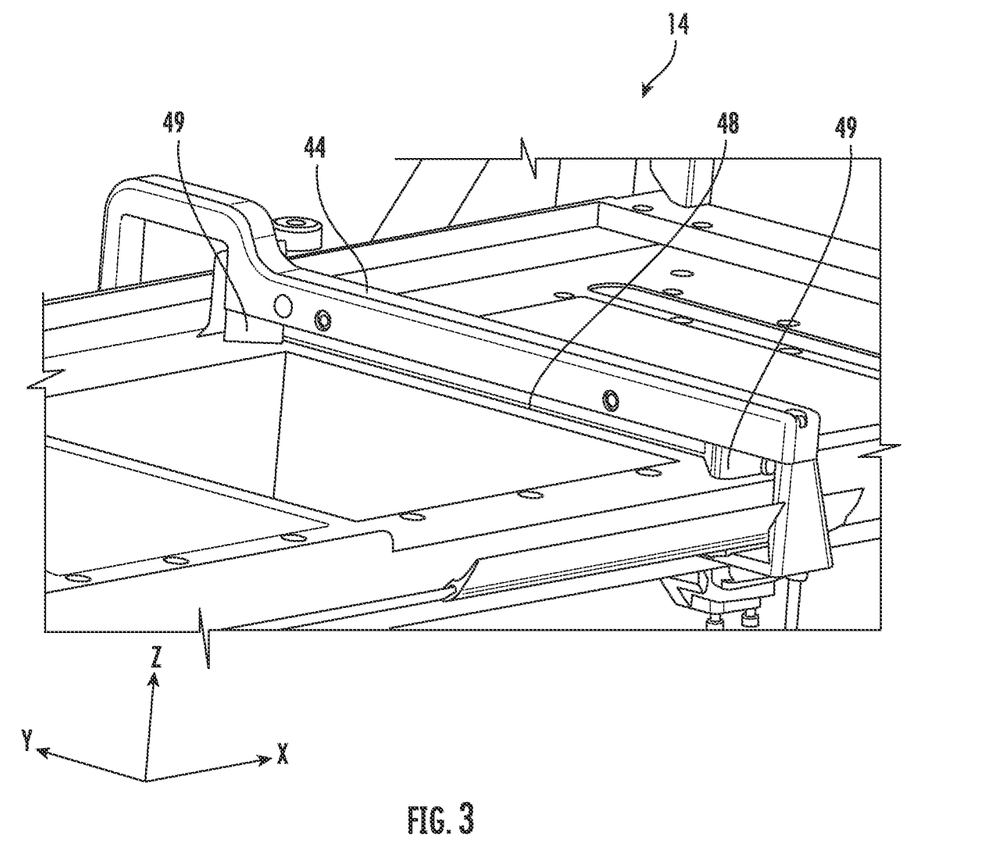
FIG. 3 is an isometric drawing of a second embodiment of a coating module.

FIG. 3 illustrates a second embodiment of a coating module 14. In this second embodiment, the coater 44 includes a smoothing member 48 that is a non-rotating blade. The coater 44 also includes a pair of powder deflectors 49 at opposed ends of the smoothing member 48. The coater 44 is mounted upon linear bearings and is coupled to a movement mechanism such as a motorized belt or lead screw/bearing based mechanism as discussed supra. Whether for vertical or horizontal movement, such movement mechanisms are known in the art of three-dimensional (3D) printing.

Figure 4:
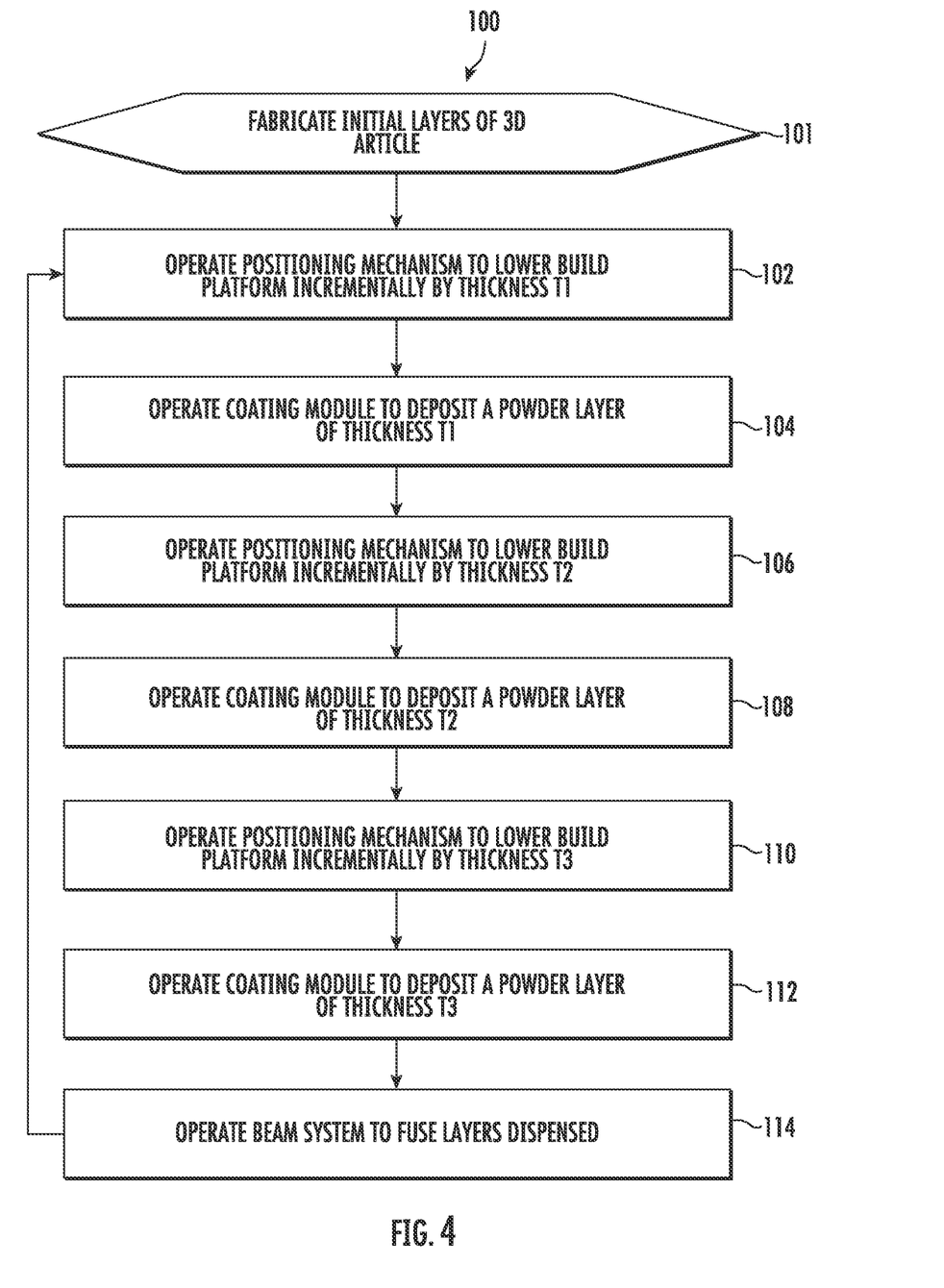
FIG. 4 is a flowchart of a method of fabricating layers of a 3D article.

FIGS. 4 and 5A-D illustrate an embodiment of a method 100 of operating the movement mechanism 12, the coating module 14, and the consolidation module 24 to form at least one new layer of the 3D article 4. Method 100 corresponds to step (1) and step (2) described with respect to FIG. 1 and is a particular embodiment thereof. FIG. 4 is a flowchart of the method 100. FIGS. 5A-D are example and simplified cross sectional views illustrating steps of method 100. Controller 3 is configured to perform the steps of method 100 by the execution of software instructions stored on non-transient information storage module 36 by processor 34.

Figure 5A:
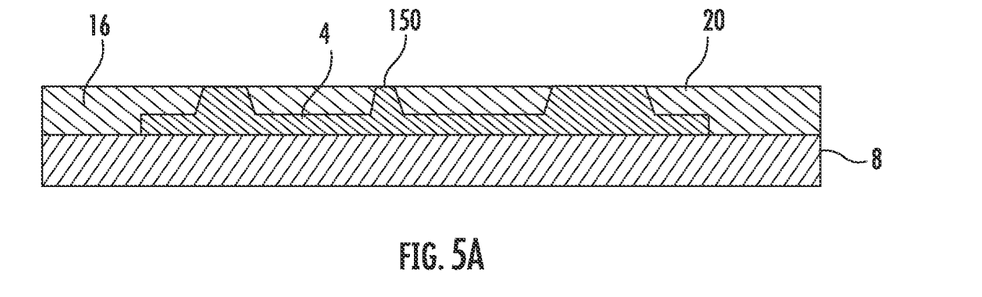
FIG. 5A is a simplified sectional view of a partially fabricated 3D article on a build platform.

According to 101, a number of layers of 3D article 4 have been fabricated resulting in the sectional illustration of FIG. 5A. At this stage of fabrication, the 3D article 4 has various projections 150 that extend up to upper surface 20. In FIG. 5A, the upper surface is in line with build plane 22.

Figure 5B:
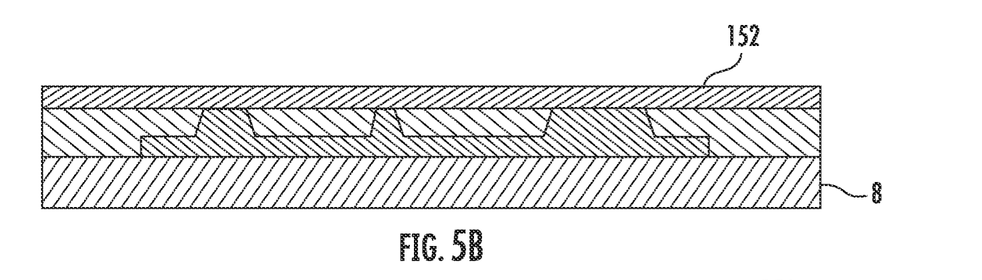
FIG. 5B is a sectional view of the partially fabricated 3D article of FIG. 5A with an added first sublayer of powder.

According to 102, the movement mechanism 12 is operated to lower (−Z direction) the build platform 8 by a vertical distance T1. According to 104, the coating module 14 is operated to deposit a first sublayer of powder 152 over the upper surface 20. First sublayer 152 has a vertical thickness equal to T1. The results of steps 102 and 104 is illustrated in FIG. 5B. Because of the projections 150, the first sublayer of powder 152 may not be flat as desired.

Figure 5C:
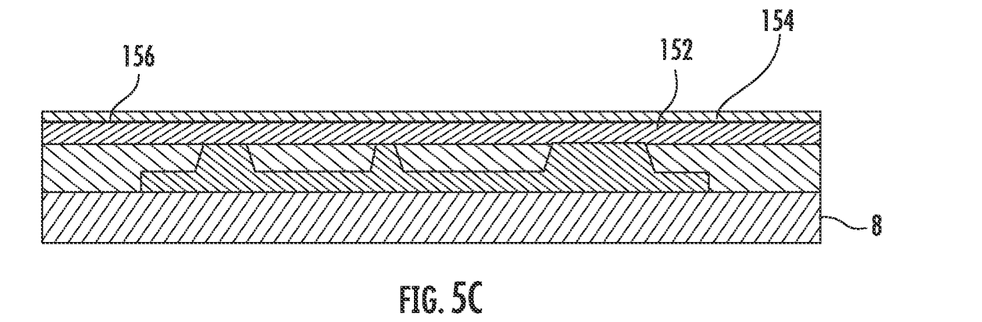
FIG. 5C is a sectional view of the partially fabricated 3D article of FIG. 5B with an added second sublayer of powder deposited over the first sublayer of powder.

According to 106, the movement mechanism 12 is operated to lower the build platform 8 by a vertical distance T2. The vertical distance T2 is less than 20% of the distance T1. According to 108, the coating module 114 is operated to deposit a second sublayer 154 of powder 16 over the first sublayer 152. The second sublayer 152 has a vertical thickness equal to T2. The second sublayer 154 has the effect of helping to smooth out imperfection in an upper surface 156 of first sublayer 152. The result of steps 106 and 108 is illustrated in FIG. 5C.

Figure 5D:
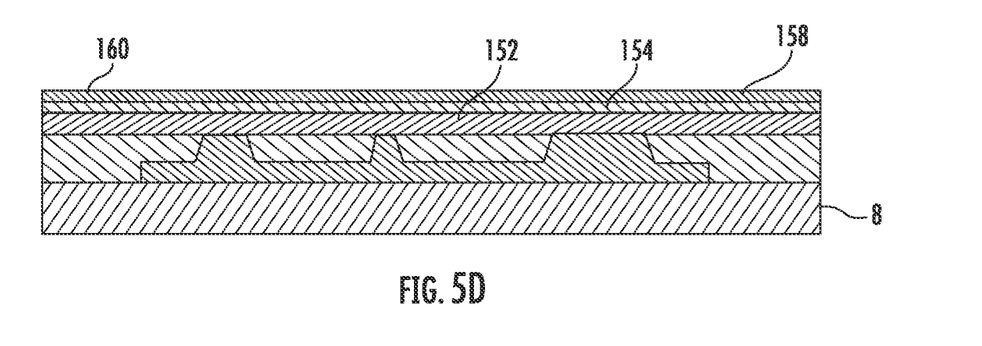
FIG. 5D is a sectional view of the partially fabricated 3D article of FIG. 5C with an added third sublayer of powder deposited over the second sublayer of powder.

According to 110, the movement mechanism 12 is operated to lower the build platform 8 by a vertical distance T3. The vertical distance T3 is less than 20% of the distance T1. According to 112, the coating module 114 is operated to deposit a third sublayer 158 of powder 16 over the second sublayer 154. The third sublayer has a vertical thickness equal to T3. The third sublayer 158 has the effect of further smoothing out surface imperfections. The result of steps 101-112 is shown in FIG. 5D.

According to various embodiments, the coating during steps 104, 108, and 112 can occur bidirectionally. The translation direction can vary between a first direction (+X) and a second direction (−X). Variations are possible. For example, step 104 can occur in the first direction (+X), step 108 can occur in the second direction (−X), and step 112 can occur in the first direction (+X).

According to 114, the consolidation module 24 is operated to selectively consolidate (bind, fuse, sinter, or melt) the layers 152, 154, and 158. Then the process loops back to 102.

Variations in method 100 are possible. In a first implementation, steps 110 and 112 are skipped. In other words, the consolidation of step 114 occurs after step 108 and then the process loops back to step 102. In various implementations, the overall powder thickness deposited (T1+T2 and optionally T3) can vary from about 20 microns to about 500 microns.

As a second implementation, the distances or thicknesses T2 and T3 are the same. As a third implementation the distances or thicknesses T2 and T3 are different. The distance or thickness T1 can be in a range of 20 to 500 microns. The distance or thickness T2 can be less than 10% of T1. The distance or thickness T3 can be less than 10% of T1. T2 and/or T3 can be less than 10 microns, less than 5 microns, less than 3 microns, less than two microns, or about 1 micron. T2 and/or T3 can be within a range of 1-5 microns, 1-4 microns, 1-3 microns, 1-2 microns, or about 1 micron.

As a fourth implementation, steps 102-112 (or 102-108) can be repeated for all layers of the article 4. In a fifth implementation, steps 102-112 (or 102-108) are repeated for only some of the layers of the article 4. In a sixth implementation, steps 102-112 (or 102-108) are performed in response to an computation related to a geometry of underlying layers and/or a desired degree of planarity for an upper surface 160 before step 114.

Figure 6A:
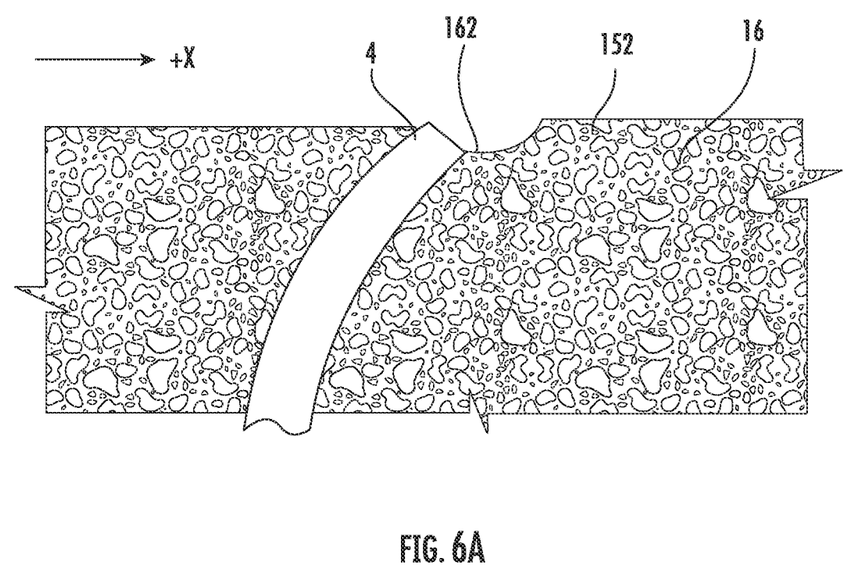
FIG. 6A is a cross-sectional view illustrating a depression-type defect left after coating a first sublayer of powder deposited in a +X direction.
Figure 6B:
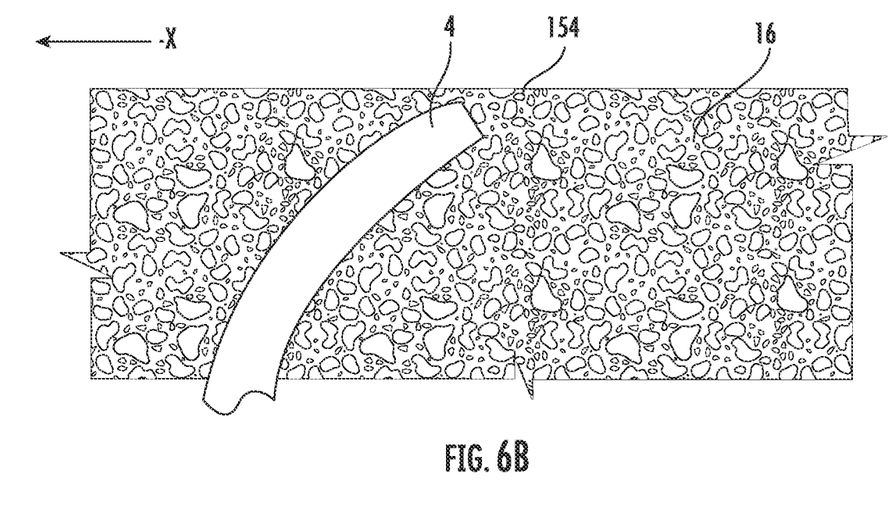
FIG. 6B illustrates elimination of the depression-type defect of FIG. 6A with a second sublayer of powder deposited in a −X direction.

FIGS. 6A and 6B illustrate an advantage of bidirectional translation motion on a quality of coating. This is for an embodiment similar to the method 100 except that steps 110 and 112 may be skipped (two sublayers per layer).

In the illustrated embodiment of FIG. 6A, a 3D article 4 is shown with a thin part projecting upward. A first sublayer 152 is deposited as the coater 44 moves in a first (+X) direction as indicated. The thin projection of 3D article 4 has a fluidic effect on the sublayer 152 and leaves a depression 162. The result of FIG. 6A corresponds to step 104 of method 100 and FIG. 5B.

In the illustrated embodiment of FIG. 6B, a second sublayer 154 of powder has been deposited as the coater moves in a second (−X) direction that is opposite to the first direction. This has the effect of smoothing out the depression 162. The result of FIG. 6B corresponds to step 108 of method 100 and FIG. 5C.

Figure 7A:
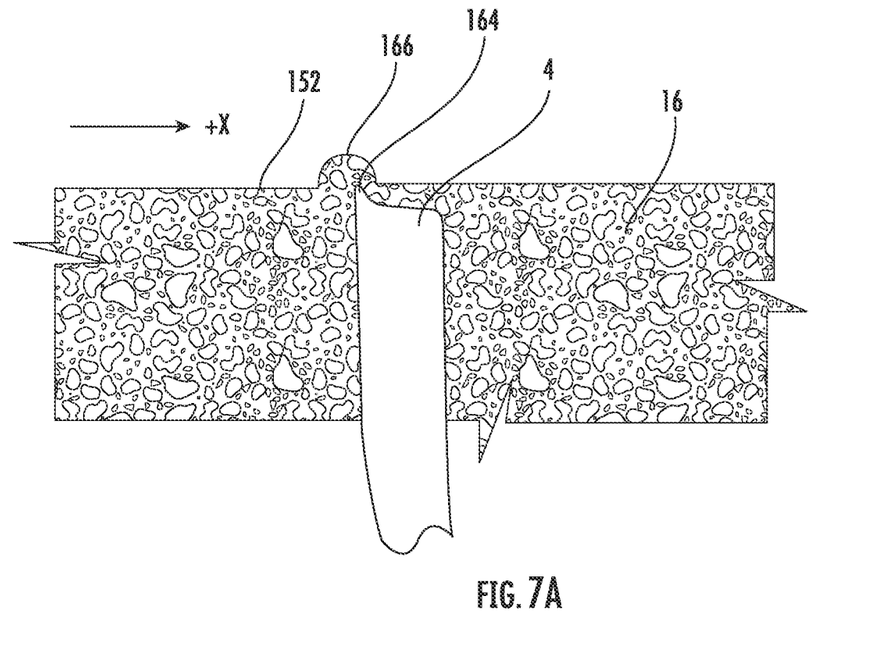
FIG. 7A is a cross-sectional view illustrating a lump-type defect left after coating a first sublayer of powder deposited in a +X direction.
Figure 7B:
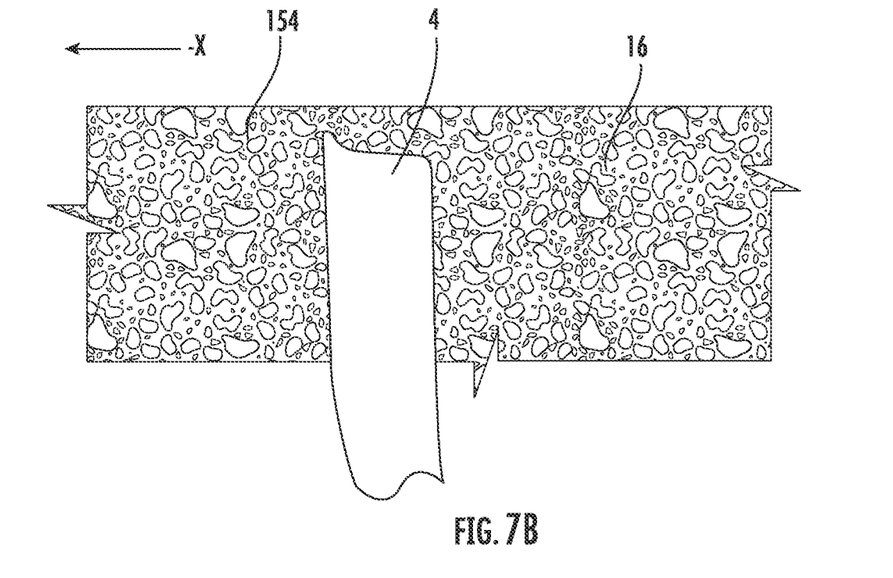
FIG. 7B illustrates elimination of the lump-type defect of FIG. 7A with a second sublayer of powder deposited in a −X direction.

FIGS. 7A and 7B illustrate another advantage of bidirectional translation motion on a quality of coating. This is for an embodiment similar to the method 100 except that steps 110 and 112 may be skipped (two sublayers per layer).

In the illustrated embodiment of FIG. 7A, a projection of a 3D article 4 is shown. A first sublayer 152 is deposited as the coater 44 moves in a first (+X) direction as indicated. During formation of the first sublayer 152 smoothing member 48 strikes or impinges upon a projecting tip 164 and of the 3D article 4 and this results in a small lump 166 of powder that projects upward from sublayer 152.

In the illustrated embodiment of FIG. 7B, a second sublayer 154 of powder has been deposited as the coater moves in a second (−X) direction that is opposite to the first direction. This has the effect of smoothing out the lump 166. The result of FIG. 6B corresponds to step 108 of method 100 and FIG. 5C.

Optionally, steps 110 and 112 can be performed to provide an even smoother upper surface 160 (FIG. 5D). Whether to deposit two or three sublayers is dependent upon factors such as tolerances and geometry of the 3D article 4.

The specific embodiments and applications thereof described above are for illustrative purposes only and do not preclude modifications and variations encompassed by the scope of the following claims.

What is claimed:

1. A three-dimensional (3D) printing system including:
 a build platform;
 a movement mechanism configured to vertically position the build platform;
 a coating module;
 a consolidation module; and
 a controller configured to:
 (1) operate the movement mechanism and the coating module to deposit a new layer of powder over an upper surface of the build platform or a previously deposited layer of powder arranged over the build platform;
 (2) operate the consolidation module to selectively consolidate the new layer of powder; and
 (3) repeat (1) and (2) until a three-dimensional (3D) article is fabricated from a plurality of consolidated layers;
 wherein (1) includes for one or more of the plurality of layers:
 (a) operate the movement mechanism and the coating module to deposit a first sublayer of powder having a thickness T1 over a vertically protruding structure of the 3D article being fabricated as the coating module translates along a first direction (+X); and
 (b) operate the movement mechanism and the coating module to deposit a second sublayer of powder having at thickness T2 over the first sublayer of powder as the coating module translates along a second direction (−X) that is opposite to the first direction, T2 being less than 20% of T1.

2. The three-dimensional (3D) printing system of claim 1 wherein the coating module includes a smoothing member with a controlled spacing over the upper surface, the controlled spacing determines a thickness of a sublayer of powder that is deposited during (a) and (b), and the smoothing member includes one or more of a blade, a tube, and a roller.

3. The three-dimensional (3D) printing system of claim 2 wherein the smoothing member has a fixed vertical position and the controlled spacing is determined by a vertical positioning of the build platform bar the movement mechanism.

4. The three-dimensional (3D) printing system of claim 2 wherein during step (a) the smoothing member is translated along the first direction (+X) and during step (b) the smoothing member is translated along the second direction (−X) that is opposite to the first direction.

5. The three-dimensional (3D) printing system of claim 1 wherein the consolidation module is one of an energy beam module and a binder dispensing module.

6. The three-dimensional (3D) printing system of claim 1 wherein (1) includes:
 operate the movement mechanism to lower the build platform by a distance generally equal to a sublayer thickness; and
 operate the coating module to pass over the build platform to deposit a sublayer of powder.

7. The three-dimensional (3D) printing system of claim 1 wherein step (1) further includes (c) operate the movement mechanism and the coating module to deposit a third sublayer of powder having at thickness T3 over the second sublayer of powder, T3 being less than 20% of T1.

8. The three-dimensional (3D) printing system of claim 1 wherein T2 is less than 10% of T1.

9. The three-dimensional (3D) printing system of claim 1 wherein T1 is within a range of 20 to 500 microns.

10. The three-dimensional (3D) printing system of claim 9 wherein T2 is less than 5 microns.

11. A method of manufacturing a three-dimensional (3D) article, the method comprising:
 (1) providing a three-dimensional (3D) printing system including:
 a build platform;
 a movement mechanism configured to vertically position the build platform;
 a coating module; and
 a consolidation module;
 (2) operating the movement mechanism and the coating module to deposit a new layer of powder over an upper surface of the build platform or a previously deposited layer of powder arranged over the build platform;
 (3) operating the consolidation module to selectively consolidate the new layer of powder; and
 (4) repeating (2) and (3) until the 3D article is fabricated from a plurality of consolidated layers;
 wherein (2) includes for one or more of the plurality of layers:
 (a) operating the movement mechanism and the coating module to deposit a first sublayer of powder having a thickness T1 over a vertically protruding structure of the 3D article being fabricated as the coating module translates along a first direction (+X); and
 (b) operating the movement mechanism and the coating module to deposit a second sublayer of powder having at thickness T2 over the first sublayer of powder as the coating module translates along a second direction (−X) that is opposite to the first direction, T2 being less than 20% of T1.

12. The method of claim 11 wherein (2) includes:
 operating the movement mechanism to lower the build platform by a distance generally equal to a sublayer thickness; and
 operating the coating module to pass over the build platform to deposit a sublayer of powder.

13. The method of claim 11 wherein (2) further includes (c) operating the movement mechanism and the coating module to deposit a third sublayer of powder having at thickness T3 over the second sublayer of powder, T3 being less than 20% of T1.

14. The method of claim 11 wherein T2 is less than 10% of T1.

15. The method of claim 11 wherein T1 is within a range of 20 to 500 microns and T2 is less than 5 microns.

16. A non-transient information storage system storing software instructions that when executed by a processor are configured to operate a three-dimensional (3D) printing system to manufacture a 3D article, the 3D printing system including a build platform, a movement mechanism configured to vertically position the build platform, a coating module; and a consolidation module, execution of the software by the processor performing the following steps:

(1) operating the movement mechanism and the coating module to deposit a new layer of powder over an upper surface of the build platform or a previously deposited layer of powder arranged over the build platform;

(2) operating the consolidation module to selectively consolidate the new layer of powder; and (3) repeating (1) and (2) until the 3D article is fabricated from a plurality of consolidated layers;

wherein (1) includes for one or more of the plurality of layers:

(a) operating the movement mechanism and the coating module to deposit a first sublayer of powder having a thickness T1 over a vertically protruding structure of the 3D article being fabricated as the coating module translates along a first direction (+X); and   (b) operating the movement mechanism and the coating module to deposit a second sublayer of powder having at thickness T2 over the first sublayer of powder as the coating module translates along a second direction (−X) that is opposite to the first direction, T2 being less than 20% of T1.

17. The non-transient information storage system of claim 16 wherein step (1) further includes:

operating the movement mechanism to lower the build platform by a distance generally equal to a sublayer thickness; and   operating the coating module to pass over the build platform to deposit a sublayer of powder.

18. The non-transient information storage system of claim 16 wherein (1) further includes (c) operating the movement mechanism and the coating module to deposit a third sublayer of powder having at thickness T3 over the second sublayer of powder, T3 being less than 20% of T1.

19. The non-transient information storage system of claim 16 wherein T2 is less than 10% of T1.

20. The non-transient information storage system of claim 16 wherein T1 is within a range of 20 to 500 microns and T2 is less than 5 microns.

\* \* \* \* \*